US011984258B2

(12) United States Patent
Zhou et al.

(10) Patent No.: US 11,984,258 B2
(45) Date of Patent: May 14, 2024

(54) RARE EARTH PERMANENT MAGNET MATERIAL AND PREPARATION METHOD THEREOF

(71) Applicant: ADVANCED TECHNOLOGY & MATERIALS CO., LTD.

(72) Inventors: Lei Zhou, Beijing (CN); Tao Liu, Beijing (CN); Xinghua Cheng, Beijing (CN); Xiaojun Yu, Beijing (CN)

(73) Assignee: ADVANCED TECHNOLOGY & MATERIALS CO., LTD., Beijing (CN)

( * ) Notice: Subject to any disclaimer, the term of this patent is extended or adjusted under 35 U.S.C. 154(b) by 422 days.

(21) Appl. No.: 16/770,608

(22) PCT Filed: Nov. 14, 2018

(86) PCT No.: PCT/CN2018/115474
§ 371 (c)(1),
(2) Date: Jun. 7, 2020

(87) PCT Pub. No.: WO2019/114487
PCT Pub. Date: Jun. 20, 2019

(65) Prior Publication Data

US 2020/0303120 A1 Sep. 24, 2020

(30) Foreign Application Priority Data

Dec. 12, 2017 (CN) ........................ 201711322584.4

(51) Int. Cl.
*H01F 41/02* (2006.01)
*B22F 3/105* (2006.01)
(Continued)

(52) U.S. Cl.
CPC .......... *H01F 41/0293* (2013.01); *B22F 3/105* (2013.01); *B22F 3/24* (2013.01);
(Continued)

(58) Field of Classification Search
CPC .................................................. H01F 41/0293
See application file for complete search history.

(56) References Cited

U.S. PATENT DOCUMENTS

2009/0226339 A1* 9/2009 Nakamura ............. C23C 10/30
419/9
2010/0003156 A1* 1/2010 Suzuki ...................... B22F 3/12
420/83
(Continued)

FOREIGN PATENT DOCUMENTS

CN 104103414 A 10/2014
CN 105185498 A 12/2015
(Continued)

OTHER PUBLICATIONS

SIPO, International Search Report issued in IA No. PCT/CN2018/115474, dated Feb. 27, 2019.

*Primary Examiner* — Alexandra M Moore
*Assistant Examiner* — Austin Pollock
(74) *Attorney, Agent, or Firm* — LKGlobal | Lorenz & Kopf, LLP

(57) ABSTRACT

The present invention discloses a rare earth permanent magnet material and a preparation method thereof. The method includes a sintering treatment step performed by laying a composite powder for diffusion on the surface of a neodymium iron boron magnetic powder layer and carrying out spark plasma sintering treatment to obtain a neodymium iron boron magnet with a diffusion layer solidified on the surface thereof, and diffusion heat treatment and tempering steps. The method of the present invention has high efficiency, good diffusion effects, and reduced quantities of heavy rare earth elements.

11 Claims, 1 Drawing Sheet

(51) Int. Cl.

| | |
|---|---|
| ***B22F 3/24*** | (2006.01) |
| ***C22C 32/00*** | (2006.01) |
| ***C22C 38/00*** | (2006.01) |
| ***C23C 12/02*** | (2006.01) |
| ***H01F 1/057*** | (2006.01) |

(52) U.S. Cl.

CPC ............ *C22C 32/00* (2013.01); *C22C 32/001* (2013.01); *C22C 38/005* (2013.01); *C23C 12/02* (2013.01); *H01F 1/057* (2013.01); *H01F 41/0266* (2013.01); *B22F 2003/1051* (2013.01); *B22F 2003/248* (2013.01); *B22F 2301/355* (2013.01); *B22F 2304/10* (2013.01); *C22C 2202/02* (2013.01)

(56) References Cited

U.S. PATENT DOCUMENTS

| | | | | |
|---|---|---|---|---|
| 2011/0210810 | A1* | 9/2011 | Miyata | H01F 1/01 427/127 |
| 2011/0260816 | A1* | 10/2011 | Morimoto | H01F 1/0577 335/302 |
| 2015/0099104 | A1* | 4/2015 | Liang | H01F 1/0536 428/220 |
| 2016/0203892 | A1* | 7/2016 | Lee | B22F 5/00 419/27 |
| 2016/0297028 | A1* | 10/2016 | Sagawa | B23K 20/14 |
| 2017/0062105 | A1 | 3/2017 | Dong et al. | |
| 2017/0183765 | A1* | 6/2017 | Mino | C22C 38/005 |
| 2018/0247743 | A1 | 8/2018 | Li | |
| 2020/0143963 | A1* | 5/2020 | Simon | H01F 41/0266 |
| 2020/0303120 | A1 | 9/2020 | Zhou et al. | |

FOREIGN PATENT DOCUMENTS

| | | | | |
|---|---|---|---|---|
| CN | 105761860 A | | 7/2016 | |
| CN | 108183021 A | | 6/2018 | |
| EP | 2869311 A1 | * | 5/2015 | H01F 1/0571 |
| JP | 2005175138 A | | 6/2005 | |
| WO | WO-2016176974 A1 | * | 11/2016 | C23C 14/021 |

* cited by examiner

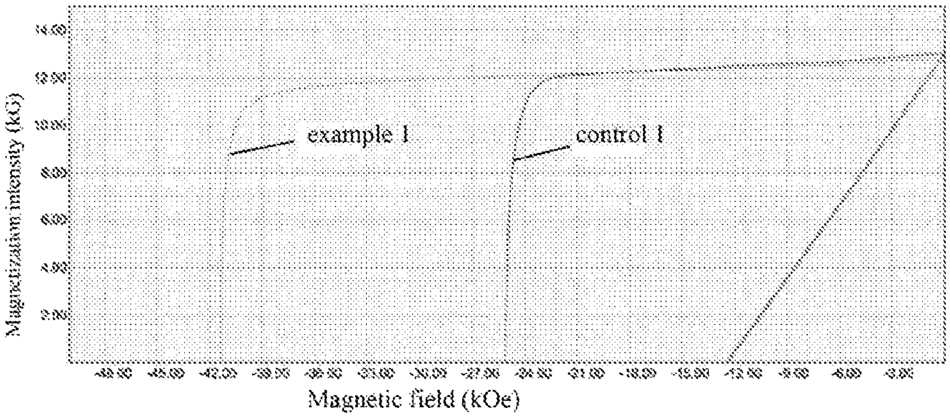
Magnetization intensity (kG)
example 1
control 1
Magnetic field (kOe)

RARE EARTH PERMANENT MAGNET MATERIAL AND PREPARATION METHOD THEREOF

RELATED APPLICATIONS

This application is the National Stage application under 35 U.S.C. 371 of PCT International Application No. PCT/CN2018/115474, filed on Nov. 14, 2018, which claims priority from Chinese Patent Application No. CN 201711322584.4, filed on Dec. 12, 2017, the contents of which are hereby incorporated by reference in their entirety.

FIELD OF INVENTION

The present invention belongs to the technical field of rare earth permanent magnet materials, and in particular relates to a rare earth permanent magnet material and a preparation method thereof. The preparation method adopts an integrated technology of pressing, plasma sintering and grain boundary diffusion, and adopts less quantities of heavy rare earth to achieve the significant improvement of magnet performance, and high-quality utilization of heavy rare earth.

BACKGROUND OF THE INVENTION

Sintered NdFeB rare earth permanent magnet, which is the permanent magnet material with the strongest magnetic properties so far, is widely used in many fields such as electronics, electromechanics, instrument and medical treatment, and is the fastest growing permanent magnet material in the world today with the best market prospect. With the rapid development of hybrid electric vehicles, high-temperature permanent magnets with an operating temperature above 200° C. are required. Therefore, higher requirements for the high-temperature magnetic properties of NdFeB magnets have been proposed.

The coercive force of ordinary NdFeB magnet decreases rapidly at high temperature, which cannot meet the requirements for use. At present, mainly doping element Dy or Tb into the NdFeB magnet is used to improve the coercive force of the magnet, thereby improving the magnetic performance of the magnet at high temperature. Studies have shown that Dy preferentially occupies the 4f crystal site in NdFeB. Each Nd is replaced by Dy to form $Dy_2Fe_{14}B$, and the coercive force will be greatly improved. Dy also affects the microstructure of magnetic materials and can suppress the growth of grains, which is also another reason for increasing the coercive force. However, the coercive force does not increase linearly as the content of the Dy increases. When the content of Dy is low, the coercive force increases quickly and then increases slowly. The reason is that some Dy elements are dissolved in the grain boundary constituent phase, and do not fully enter the main phase. At present, the method of directly adding Dy metal when smelting the master alloy is mainly used. One traditional effective method for improving the Hcj of NdFeB sintered magnet is to replace Nd in the main phase of magnet $Nd_2Fe_{14}B$ with heavy rare earth elements such as Dy and Tb to form $(Nd, Dy)_2Fe_{14}B$. The anisotropy of $(Nd, Dy)_2Fe_{14}B$ is stronger than that of $Nd_2Fe_{14}B$. Therefore, the Hcj of the magnet is significantly improved. But these heavy rare earth elements are scarce and expensive. On the other hand, the magnetic moments of Nd and iron are arranged in parallel, but Dy and iron are arranged in antiparallel, and thus the residual magnetism Br and the maximum magnetic energy product $(BH)_{max}$ of the magnet will decrease. The sintered NdFeB magnet has very poor formability, and must be post-processed to achieve qualified dimensional accuracy. However, because the material itself is very brittle, the loss of raw materials in post-processing is as high as 40-50%, which causes a huge waste of rare earth resources. At the same time, machining also increases the manufacturing cost of the materials. The bonded NdFeB magnet is basically isotropic, with low magnetic properties, and cannot be used in the fields with high magnetic requirements. In recent years, many research institutions have reported various processes for diffusing rare earth elements from the surface of the magnet into the interior of the matrix. This process makes the infiltrated rare earth elements along the grain boundaries and the surface area of the main phase grains be preferentially distributed, which not only improves the coercive force, but also saves the usage amount of precious rare earths, and makes the residual magnetism and magnetic energy product no significant reduction. However, evaporation or sputtering methods applied in mass production have low efficiency, a large amount of rare earth metals are scattered in the heating furnace chamber during the evaporation process, resulting in unnecessary waste of heavy rare earth metals. Meanwhile, the improvement of the coercive force is limited, when the surface is coated with a single rare earth oxide or fluoride for heat diffusion.

Therefore, there is a need for a rare earth permanent magnet material that has a significant increase in the coercive force, high production efficiency, low processing cost, and significant advantages of the production cost.

SUMMARY

In view of the defects of the prior art, the object of the present invention is to provide a rare earth permanent magnet material and a preparation method thereof. In the method, a technology of pressing, plasma sintering and grain boundary diffusion is used, and less quantities of heavy rare earth is used to achieve significant improvement of magnet performance, achieving high quality utilization of heavy rare earth.

The method of the invention not only realizes the ordered arrangement of rare earth elements on the surface and interior of the NdFeB matrix, but also improves the coercive force of the magnet, and meanwhile, the residual magnetism is not substantially reduced. In the present invention, a compound rich in heavy rare earth elements and pure metal powder are attached to the surface of the magnet through the SPS (Spark Plasma Sintering) hot-pressing process, and grain boundary diffusion is achieved through subsequent heat treatment, thereby improving the coercive force characteristic of the magnet. The heavy rare earth element-containing powder used in the present invention is a fluoride or oxide of Dy\Tb\Ho\Gd\Nd\Pr, and the pure metal powder is one or more of Al\Cu\Ga\Zn\Sn, etc.

In order to achieve the above-mentioned object, the present invention adopts the following technical solutions:

A preparation method of a rare earth permanent magnet material comprises:

- a sintering treatment step, laying a composite powder for diffusion on the surface of a neodymium iron boron magnetic powder layer and carrying out spark plasma sintering treatment to obtain a neodymium iron boron magnet with a diffusion layer solidified on the surface thereof, the compositional proportional formula of the composite powder for diffusion is $H_{100-x-y}M_xO_y$, wherein H is one or more of metal powders of Dy, Tb, Ho, and Gd, or H is one or more of fluoride powders or oxide powders of Dy, Tb, Ho, and Gd, M is a Nd, Pr, or NdPr metal powder, and Q is one or more of Cu, Al, Zn, and Sn metal powders, x and y are respectively the atomic percentages of component M and component Q in the composite powder for diffusion, x is 0-20 (e.g., 1, 3, 5, 7, 9, 11, 13, 15, 17, 19), and y is 0-40 (e.g., 1, 5, 10, 15, 20, 25, 30, 35, 39);

a diffusion heat treatment step, carrying out a diffusion heat treatment on a neodymium iron boron magnet with a diffusion layer solidified on the surface thereof and performing a cooling to obtain a diffused neodymium iron boron magnet;

and a tempering treatment step, carrying out a tempering treatment on the diffused neodymium iron boron magnet to obtain the rare earth permanent magnet material.

According to the preparation method of rare earth permanent magnet material in the present invention, heavy rare earth elements are mainly distributed in the grain boundary or the transition region between the grain boundary and the main phase to prepare a magnet with the same coercive force. Compared with the method that the neodymium iron boron magnetic powder is directly mixed with heavy rare earth powder, in the method of the present invention, less usage of heavy rare earth elements is adopted and the residual magnetism is basically unchanged.

In the above-mentioned preparation method, as a preferred embodiment, the x and y are not zero at the same time; more preferably, the value range of x is 2-15 (e.g., 3, 4, 6, 8, 10, 12, 14), and the value range of y is 4-25 (e.g., 5, 7, 9, 11, 13, 15, 17, 19, 21, 23, 24).

In the above-mentioned preparation method, as a preferred embodiment, the compositional proportional formula of the composite powder for diffusion is $(TbF_3)_{95}Nd_2Al_3$, $(DyF_3)_{95}Nd_1A_{14}$, $(TbF_3)_{95}Cu_5$.

In the above-mentioned preparation method, as a preferred embodiment, a particle size of the composite powder for diffusion is −150 mesh. If the particle size of the powder is too fine, the preparation process cost will increase substantially and the powder is easy to agglomerate, which is not conducive to molding; and if the particle size of the powder is too large, the effect of subsequent sintering diffusion is poor.

In the above-mentioned preparation method, as a preferred embodiment, a preparation of the composite powder for diffusion comprises: mixing the powders of the three components H, M and Q uniformly under an oxygen-free environment, sieving through 150 mesh sieve, and then getting a powder under the sieve to obtain the composite powder for diffusion. The oxygen-free environment is preferably a nitrogen gas environment; the particle size of the H component is −150 mesh, the particle size of the M component is −150 mesh, and the particle size of the Q component is −150 mesh.

In the above-mentioned preparation method, as a preferred embodiment, the neodymium iron boron magnetic powder is prepared by air flow milling.

In the above-mentioned preparation method, as a preferred embodiment, the thickness of the composite powder for diffusion laid on the surface of the neodymium iron boron magnetic powder layer is 5-30 μm (e.g., 6 μm, 8 μm, 10 μm, 12 μm, 15 μm, 18 μm, 21 μm, 23 μm, 25 μm, 27 μm, 29 μm). More preferably, the surface on which the composite powder for diffusion is laid is perpendicular to the orientation of the neodymium iron boron magnetic powder.

In the above-mentioned preparation method, as a preferred embodiment, the conditions of spark plasma sintering treatment are that the vacuum degree is not lower than $10^{-3}$ Pa (e.g., $10^{-3}$ Pa, $8\times10^{-4}$ Pa, $5\times10^{-4}$ Pa, $1\times10^{-4}$ Pa, $9\times10^{-5}$ Pa, $5\times10^{-5}$ Pa), the pressure is 20-60 Mpa (e.g., 22 Mpa, 25 Mpa, 30 Mpa, 35 Mpa, 40 Mpa, 45 Mpa, 50 Mpa, 55 Mpa, 59 Mpa), and the temperature is 700-900° C. (e.g., 710° C., 750° C., 800° C., 820° C., 850° C., 880° C.); more preferably, the temperature and pressure holding time of the spark plasma sintering treatment is 0-15 mins (e.g., 1 min, 3 min, 5 min, 7 min, 9 min, 11 min, 13 min). After spark plasma sintering, the composite powder with the compositional formula of $H_{100-x-y}M_xO_y$ is solidified (cured) and adhered to the surface of the neodymium iron boron magnet formed by the neodymium iron boron magnetic powder to form a diffusion layer. The SPS treatment of the present invention achieves the purpose of pre-forming, allowing the sintered neodymium iron boron magnet powder and the composite powder on the surface to bond tightly by chemical bonding instead of simple physical contact under pressure and temperature, thereby facilitating subsequent sintering diffusion process. The too low plasma sintering temperature results in the loose powder bonding to cause defects such as edge fall in the subsequent process. The excessive pressure can cause performance deterioration.

In the above-mentioned preparation method, as a preferred embodiment, a thickness in the orientation direction of the neodymium iron boron magnetic powder layer is controlled to 1-12 mm.

In the above-mentioned preparation method, as a preferred embodiment, the conditions of the diffusion heat treatment are that the vacuum degree is not lower than $10^{-3}$ Pa (e.g., $10^{-3}$ Pa, $8\times10^{-4}$ Pa, $5\times10^{-4}$ Pa, $1\times10^{-4}$ Pa, $9\times10^{-5}$ Pa, $5\times10^{-5}$ Pa), the temperature is 700-950° C. (e.g., 710° C., 750° C., 800° C., 820° C., 850° C., 880° C., 900° C., 920° C., 940° C.), the temperature holding time is 2~30 hours (e.g., 3 h, 5 h, 8 h, 12 h, 15 h, 20 h, 25 h, 28 h); more preferably, the diffusion heat treatment is performed in a vacuum heat treatment furnace. The too low holding temperature results in non-obvious diffusion treatment effect; the too high holding temperature will result in abnormal growth of the grains to deteriorate magnetic properties instead. The selection of the temperature holding time is related to the thickness of the magnet, and the thick magnet may have a longer processing time. The matching of temperature with time will help to achieve both good processing effects and efficient use of energy.

In the above-mentioned preparation method, as a preferred embodiment, the cooling means cooling with the furnace (furnace cooling) to not higher than 50° C. (e.g., 48° C., 45° C., 40° C., 35° C., 30° C.).

In the above-mentioned preparation method, as a preferred embodiment, the temperature of the tempering treatment is 420-640° C. (e.g., 430° C., 450° C., 480° C., 520° C., 550° C., 590° C., 620° C., 630° C.), and the temperature holding time thereof is 2-10 hours (e.g., 3 h, 5 h, 8 h, 9 h). Under the tempering system, the formation and maintenance of grain boundary phases rich in heavy rare earth elements are facilitated, and the performance of products beyond the preferred temperature range will be slightly reduced.

The preferred embodiment in the above methods can be used in any combination.

The rare earth permanent magnet material is prepared by the above-mentioned preparation method.

In summary, the method of the present invention uses a combination of pressing, plasma sintering and grain boundary diffusion technology, and less quantities of heavy rare earth is adopted to achieve a significant improvement of the magnet performance, and thus high quality utilization of heavy rare earth is achieved. A mixed powder solidified layer (also known as diffusion layer) with a good binding force is formed by a compound rich in rare earth elements and pure metal powder on the surface of the sintered NdFeB magnet. Then the entire magnet is heated to a temperature range of 700 to 950° C. and maintained for 2 to 30 hours to make the heavy rare earth elements, rare earth elements, and pure metal elements diffuse into the interior of magnet through the grain boundaries at a high temperature, and then performed tempering treatment at 420 to 640° C. for 2 to 10 hours to finally improve the magnetic properties of NdFeB magnet. The method can increase the coercive force of the sintered NdFeB magnet by 4000-16300 Oe, reduce the residual magnetism by only 1-2%, and 35% of heavy rare earth usage can be saved relative to the magnet with the same performance as the magnet of the present application.

The advantages of the present invention are that the NdFeB matrix, the compound rich in rare earth elements and the pure metal powder are well combined through the integrated method of SPS technology and infiltration technology; after high temperature treatment, the rare earth compound and pure metal powder in the powder layer diffuse to the boundary area between the main phase and the neodymium-rich phase in the magnet, enriching. The coercive force of NdFeB magnet is significantly improved by these treatments. The present invention opens a novel route for improving the performance of rare earth permanent magnet material NdFeB. According to the present invention, the performance of the magnet is improved, on one hand, it is highly efficient and the solid state combination of heavy rare earth elements and the matrix magnet is more conducive to diffusion; on the other hand, the amount of heavy rare earth used is greatly reduced, which reduces the cost of the products and makes the product cost-effective. The integration of pressing and sintering using SPS technology and infiltration brings about the improved yield of the finished-products (diffusion penetration are preformed after pressing for forming in the present invention, and compared with the previous penetration technology, large magnets do not need to be cut and processed, which reduces product defects and losses due to the cutting processing; in the entire process, products fail to contact the natural environment, which limits the oxidation loss of the products to the maximum), significantly improved coercive force, high production efficiency, low processing cost, having significant advantage of production cost.

BRIEF DESCRIPTION OF THE DRAWINGS

FIG. 1 is a comprehensive magnetic performance diagram of the magnet prepared by example 1.

DETAILED DESCRIPTION OF THE EMBODIMENTS

The present invention will be further described in combination with examples below. Examples of the present invention are only used to describe the present invention, not to limit the present invention.

The neodymium iron boron magnetic powder used in the following examples is prepared by air flow milling. It can be a commercial product, or it can be prepared according to common methods.

The SPS technology adopted by the present invention is a pressure sintering method which uses direct-current pulse current for electrifying sintering. The basic principle is that the discharge plasma generated instantaneously by supplying a direct-current pulse current to the electrode causes each particle in the sintered body to generate Joule heat uniformly and activates the particle surface, and sintering is achieved while the pressure is applied. The application of the SPS technology to the present invention has the following characteristics that: (1) sintering temperature is low, generally as low as 700-900° C.; (2) temperature holding time for sintering is short, only 3-15 minutes; (3) fine and uniform structures can be obtained; (4) High density materials can be obtained.

Example 1

(1) Preparation of the composite powder based on the compositional formula (component formula) of the powder $(TbF_3)_{95}Nd_2Al_3$ (the subscript in the formula is the atomic percentage of the corresponding element): $TbF_3$ powder (particle size: −150 mesh), metal Nd powder (particle size: −150 mesh), and metal Al powder (particle size: −150 mesh) are weighed, and the above powder is mixed uniformly and passed through a sieve of 150 mesh, and the powder under the sieve (called as siftage hereafter) is taken as the composite powder, wherein the powder mixing and sieving process is performed under a nitrogen environment.

(2) The neodymium iron boron magnetic powder for commerce (compositional ratio: $Nd_{92}Pr_3Dy_{1.2}Tb_{0.6}Fe_{80}B_6$, wherein the subscript is the atomic percentage of the corresponding element) obtained by air flow milling is placed in a cemented carbide mold, and at the same time the composite powder which has a thickness of 20 μm is laid on the surface layer perpendicular to the orientation) prepared by step (1). The neodymium iron boron magnet with $(TbF_3)_{95}Nd_2Al_3$ powder solidified layer solidified on the surface thereof is obtained by hot-pressing sintering under the $10^{-3}$ pa of vacuum degree, 30 Mpa of pressure, and 750° C. of temperature, using spark plasma sintering technology, wherein the thickness in the orientation direction is 6 mm.

(3) The neodymium iron boron magnet with one uniform powder solidified layer on the surface obtained in step (2) is placed in a vacuum heat treatment furnace, and maintained under the $10^{-3}$ pa of vacuum and 800° C. of temperature for 6 hours for the diffusion heat treatment; and cooled with furnace to no higher than 50° C.

(4) The magnet obtained in step (3) is further subjected to tempering treatment at 510° C. for 4 hours to obtain a magnet with improved performance, which is the rare earth permanent magnet material of the present invention.

Control 1 is set when a magnet with improved performance is prepared according to the method of this example. The preparation method of control 1 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, pressing, and sintering with the same composition formulation as example 1; the properties of magnet obtained are shown in Table 1.

FIG. 1 is a BH curve of performance tests of the magnets of the example 1 of the present invention and control 1; it can be seen from FIG. 1 that after the technical treatment of steps (2), (3), and (4) of this example, the coercive force of the sintered neodymium iron boron increases from 25070 Oe to 41330 Oe, with an increase of 16260 Oe, and the residual magnetism of the sintered neodymium iron boron decreases slightly, that is, from 13010 Gs to 12790 Gs, with a decrease of 220 Gs. After processing, the coercive force of comprehensive magnetic properties Hcj+$(BH)_{max}$ of the sintered neodymium iron boron is 80.66.

Example 2

(1) Preparation of the composite powder based on the proportional formula of the powder $(DyF_3)_{95}Nd_1Al_4$ (the subscript in the formula is the atomic percentage of the corresponding element): $DyF_3$ powder (particle size: −150 mesh), metal Nd powder (particle size: −150 mesh), and metal Al powder (particle size: −150 mesh) are weighed, and the above powder is mixed uniformly and passed through a sieve of 150 mesh, wherein the powder mixing and sieving process is performed under a nitrogen environment.

(2) The neodymium iron boron magnetic powder for commerce (composition ratio: $Nd_{10.8}Pr_3Tb_{0.4}Fe_{79.8}B_6$, wherein the subscript is the atomic percentage of the corresponding element) obtained by air flow milling is placed in a cemented carbide mold, and at the same time 25 μm thickness of the powder prepared by step (1) is laid on the surface layer in the direction which is perpendicular to the orientation. The neodymium iron boron magnet with $(DyF_3)_{95}Nd_1Al_4$ powder solidified layer solidified on the surface thereof is obtained by hot-pressing sintering under the $10^{-3}$ pa of vacuum, 30 Mpa of pressure, and 750° C. of temperature, using spark plasma sintering technology, wherein the thickness in the orientation direction is 7 mm.

(3) The magnet with a uniform powder solidified layer on the surface thereof obtained in step (2) is placed in a vacuum heat treatment furnace, and maintained under the vacuum of $10^{-3}$ pa and the temperature of 800° C. for 6 hours; and cooled with furnace to no higher than 50° C.

(4) The magnet obtained in step (3) is further subjected to tempering treatment at 510° C. for 4 hours to obtain a magnet with improved performance.

Control 2 is set when a magnet with improved performance is prepared according to the method of this example. The preparation method of control 2 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 2; the properties of the magnet obtained are shown in Table 1.

The coercive force of the rare earth permanent magnet material prepared and obtained in this example increases by 7700 oe, and the residual magnetism decreases slightly by 185 Gs. The magnet performance test results of example 2 and control 2 are shown in Table 1.

Example 3

(1) Preparation of the composite powder based on the proportional formula of the powder $(TbF_3)_{95}Cu_5$ (the subscript in the formula is the atomic percentage of the corresponding element): $TbF_3$ powder (particle size: −150 mesh) and metal Cu powder (particle size: −150 mesh) are weighed, and the above powder is mixed uniformly and passed through a sieve of 150 mesh, wherein the powder mixing and sieving process is performed under a nitrogen environment.

(2) The neodymium iron boron magnetic powder for commerce (composition ratio: $Nd_{11.9}Pr_3Dy_{0.1}Fe_{79}B_6$, wherein the subscript is the atomic percentage of the corresponding element) obtained by air flow milling is placed in a cemented carbide mold, and at the same time, 30 μm thickness of the powder prepared by step (1) is laid on the surface layer in the direction which is perpendicular to the orientation. The neodymium iron boron magnet with $(TbF_3)_{95}Cu_5$ powder solidified layer solidified on the surface thereof is obtained by hot-pressing sintering under the $10^{-3}$ pa of vacuum, 50 Mpa of pressure, and 780° C. of temperature, using spark plasma sintering technology, wherein the thickness in the orientation direction is 12 mm.

(3) The magnet with a uniform powder solidified layer on the surface obtained in step (2) is placed in a vacuum heat treatment furnace, and maintained under the $10^{-3}$ pa of vacuum and 850° C. of temperature for 6 hours; and cooled with furnace to no higher than 50° C.

(4) The magnet obtained in step (3) is further subjected to tempering treatment at 510° C. for 4 hours to obtain a magnet with improved performance.

Control 3 is set when a magnet with improved performance is prepared according to the method of this example. The preparation method of control 3 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 3; the properties of magnet obtained are shown in Table 1.

The coercive force of the rare earth permanent magnet material prepared and obtained in this example increases by 14000 Oe, and the residual magnetism decreases slightly by 190 Gs. The magnet performance test results of example 3 and control 3 are shown in Table 1.

Example 4

(1) Preparation of the composite powder based on the proportional formula of the powder $(HoF_3)_{97}Pr_1Cu_2$ (the subscript in the formula is the atomic percentage of the corresponding element): $HoF_3$ powder (particle size: −150 mesh), metal Pr powder (particle size: −150 mesh) and metal Cu powder (particle size: −150 mesh) are weighed, and the above powder is mixed uniformly and passed through a sieve of 150 mesh, wherein the powder mixing and sieving process is performed under a nitrogen gas environment.

(2) The neodymium iron boron magnetic powder for commerce (composition ratio: $Nd_{11.8}Pr_3Dy_{0.1}Fe_{79}B_{6.1}$, wherein the subscript is the atomic percentage of the corresponding element) obtained by air flow milling is placed in a cemented carbide mold, and at the same time, 20 μm thickness of the powder prepared by step (1) is laid on the surface layer in the direction which is perpendicular to orientation. The neodymium iron boron magnet with $(HoF_3)_{97}Pr_1Cu_2$ powder solidified layer solidified on the surface thereof is obtained by hot-pressing sintering under the $10^{-3}$ pa of vacuum, 20 Mpa of pressure, and 750° C. of temperature, using spark plasma sintering technology, wherein the thickness in the orientation direction is 3 mm.

(3) The magnet with a uniform powder solidified layer on the surface obtained in step (2) is placed in a vacuum heat treatment furnace, and maintained under the less than $10^{-3}$ pa of vacuum and 800° C. of temperature for 6 hours; and cooled with furnace to no higher than 50° C.

(4) The magnet obtained in step (3) is further subjected to tempering treatment at 510° C. for 4 hours to obtain a magnet with improved performance.

Control 4 is set when a magnet with improved performance is prepared according to the method of this example. The preparation method of control 4 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 4; the properties of magnet obtained are shown in Table 1.

The coercive force of the rare earth permanent magnet material prepared and obtained in this example increases by 4500 Oe, and the residual magnetism decreases slightly by 215 Gs. The magnet performance test results of example 4 and control 4 are shown in Table 1.

Example 5

(1) Preparation of the composite powder based on the proportional formula of the powder $(DyTb)F_3)_{96}Cu_1Al_3$ (the subscript in the formula is the atomic percentage of the corresponding element): $(DyTb)F_3$ powder (particle size: −150 mesh), metal Cu powder (particle size: −150 mesh) and metal Al powder (particle size: −150 mesh) are weighed, and the above powder is mixed uniformly and passed through a sieve of 150 mesh, wherein the powder mixing and sieving process is performed under a nitrogen environment.

(2) The neodymium iron boron magnetic powder for commerce (composition ratio: $Nd_{14.6}Tb_{0.3}Fe_{79}B_{6.1}$, wherein the subscript is the atomic percentage of the corresponding element) obtained by air flow milling is placed in a cemented carbide mold, and at the same time, 30 μm thickness of the powder prepared by step (1) is laid on the surface layer in the direction which is perpendicular to the orientation. The neodymium iron boron magnet with $((DyTb)F_3)_{96}Cu_1Al_3$ powder solidified layer solidified on the surface thereof is obtained by hot-pressing sintering under the $10^{-3}$ pa of vacuum, 20 Mpa of pressure, and 750° C. of temperature, using spark plasma sintering technology, wherein the thickness in the orientation direction is 8 mm.

(3) The magnet with a uniform powder solidified layer on the surface obtained in step (2) is placed in a vacuum heat treatment furnace, and maintained under the $10^{-3}$ pa of vacuum and 800° C. of temperature for 6 hours; and cooled with furnace to no higher than 50° C.

(4) The magnet obtained in step (3) is further subjected to tempering treatment at 510° C. for 4 hours to obtain a magnet with improved performance.

Control 5 is set when a magnet with improved performance is prepared according to the method of this example. The preparation method of control 5 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 5; the properties of magnet obtained are shown in Table 1.

The coercive force of the rare earth permanent magnet material prepared and obtained in this example increases by 12000 Oe, and the residual magnetism decreases slightly by 188 Gs. The magnet performance test results of example 5 and control 5 are shown in Table 1.

Example 6

(1) Preparation of the composite powder based on the proportional formula of the powder $(GdF_3)_{98}Cu_2$ (the subscript in the formula is the atomic percentage of the corresponding element): $GdF_3$ powder (particle size: −150 mesh) and metal Cu powder (particle size: −150 mesh) are weighed, and the above powder is mixed uniformly and passed through a sieve of 150 mesh, wherein the powder mixing and sieving process is performed under a nitrogen environment.

(2) The neodymium iron boron magnetic powder for commerce (composition ratio: $Nd_{11.5}Pr_3Dy_{0.3}Fe_{79.2}B_6$, wherein the subscript is the atomic percentage of the corresponding element) obtained by air flow milling is placed in a cemented carbide mold, and at the same time, 20 μm thickness of the powder prepared by step (1) is laid on the surface layer in the direction which is perpendicular to the orientation. The neodymium iron boron magnet with $(GdF_3)_{98}Cu_2$ powder solidified layer solidified on the surface thereof is obtained by hot-pressing sintering under the $10^{-3}$ pa of vacuum, 20 Mpa of pressure, and 750° C. of temperature, using spark plasma sintering technology, wherein the thickness in the orientation direction is 4 mm.

(3) The magnet with a uniform powder solidified layer on the surface obtained in step (2) is placed in a vacuum heat treatment furnace, and maintained under the less than $10^{-3}$ pa of vacuum and 800° C. of temperature for 6 hours; and cooled with furnace to no higher than 50° C.

(4) The magnet obtained in step (3) is further subjected to tempering treatment at 510° C. for 4 hours to obtain a magnet with improved performance.

Control 6 is set when a magnet with improved performance is prepared according to the method of this example. The preparation method of control 6 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 6; the properties of magnet obtained are shown in Table 1.

The coercive force of the rare earth permanent magnet material prepared and obtained in this example increases by 4600 Oe, and the residual magnetism decreases slightly by 218 Gs. The magnet performance test results of example 6 and control 6 are shown in Table 1.

Example 7

(1) Preparation of the composite powder based on the proportional formula of the powder $(TbO_3)_{94}Nd_1Al_5$ (the subscript in the formula is the atomic percentage of the corresponding element): $TbO_3$ powder (particle size: −150 mesh), metal Nd powder (particle size: −150 mesh) and metal Al powder (particle size: −150 mesh) are weighed, and the above powder is mixed uniformly and passed through a sieve of 150 mesh, wherein the powder mixing and sieving process is performed under a nitrogen environment.

(2) The neodymium iron boron magnetic powder for commerce (composition ratio: $Nd_{10.7}Pr_3Tb_{0.5}Fe_{80}B_{5.8}$, wherein the subscript is the atomic percentage of the corresponding element) obtained by air flow milling is placed in a cemented carbide mold, and at the same time, 30 μm thickness of the powder prepared by step (1) is laid on the surface layer in the direction which is perpendicular to the orientation. The neodymium iron boron magnet with $(TbO_3)_{94}Nd_1Al_5$ powder solidified layer solidified on the surface thereof is obtained by hot-pressing sintering under the $10^{-3}$ pa of vacuum, 50 Mpa of pressure, and 780° C. of temperature, using spark plasma sintering technology, wherein the thickness in the orientation direction is 12 mm.

(3) The magnet with a uniform powder solidified layer on the surface obtained in step (2) is placed in a vacuum heat treatment furnace, and maintained under the $10^{-3}$ pa of vacuum and 800° C. of temperature for 6 hours; and cooled with furnace to no higher than 50° C.

(4) The magnet obtained in step (3) is further subjected to tempering treatment at 510° C. for 4 hours to obtain a magnet with improved performance.

Control 7 is set when a magnet with improved performance is prepared according to the method of this example. The preparation method of control 7 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 7; the properties of magnet obtained are shown in Table 1.

The coercive force of the rare earth permanent magnet material prepared and obtained in this example increases by 9000 Oe, and the residual magnetism decreases slightly by 195 Gs. The magnet performance test results of example 7 and control 7 are shown in Table 1.

Example 8

(1) Preparation of the composite powder based on the proportional formula of the powder $(DyO_3)_{97}(PrNd)_2Al_1$ (the subscript in the formula is the atomic percentage of the corresponding element): $DyO_3$ powder (particle size: −150 mesh), metal PrNd powder (the ratio of Pr and Nd by weight is 1:4, particle size: −150 mesh) and metal Al powder (particle size: −150 mesh) are weighed, and the above powder is mixed uniformly and passed through a sieve of 150 mesh, wherein the powder mixing and sieving process is performed under a nitrogen environment.

(2) The neodymium iron boron magnetic powder for commerce (composition ratio: $Nd_{12.2}Pr_{3.1}Fe_{78.6}B_{6.1}$, wherein the subscript is the atomic percentage of the corresponding element) obtained by air flow milling is placed in a cemented carbide mold, and at the same time, 23 μm thickness of the powder prepared by step (1) is laid on the surface layer in the direction which is perpendicular to the orientation. The neodymium iron boron magnet with $(DyO_3)_{97}(PrNd)_2Al_1$ powder solidified layer solidified on the surface thereof is obtained by hot-pressing sintering under the $10^{-3}$ pa of vacuum, 40 Mpa of pressure, and 760° C. of temperature, using spark plasma sintering technology, wherein the thickness in the orientation direction is 6.5 mm.

(3) The magnet with a uniform powder solidified layer on the surface obtained in step (2) is placed in a vacuum heat treatment furnace, and maintained under the less than $10^{-3}$ pa of vacuum and the 800° C. of temperature for 6 hours; and cooled with furnace to no higher than 50° C.

(4) The magnet obtained in step (3) is further subjected to tempering treatment at 510° C. for 4 hours to obtain a magnet with improved performance.

Control 8 is set when a magnet with improved performance is prepared according to the method of this example. The preparation method of control 8 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 8; the properties of magnet obtained are shown in Table 1.

The coercive force of the rare earth permanent magnet material prepared and obtained in this example increases by 7700 Oe, and the residual magnetism decreases slightly by 197 Gs. The magnet performance test results of example 8 and control 8 are shown in Table 1.

Example 9

(1) Preparation of the composite powder based on the proportional formula of the powder $(TbF_3)_{46}(DyO_3)_{48}Nd_2ZnSnCu_2$ (the subscript in the formula is the atomic percentage of the corresponding element): $TbF_3$ and $DyO_3$ powder (particle size: −150 mesh), metal Nd powder (particle size: −150 mesh), and metal Zn, Sn, Cu powder (particle size: −150 mesh) are weighed, and the above powder is mixed uniformly and passed through a sieve of 150 mesh, wherein the powder mixing and sieving process is performed under a nitrogen environment.

(2) The neodymium iron boron magnetic powder for commerce (composition ratio: $Nd_{11.5}Tb_{1.6}Fe_{80.9}B_6$, wherein the subscript is the atomic percentage of the corresponding element) obtained by air flow milling is placed in a cemented carbide mold, and at the same time, 23 μm thickness of the powder prepared by step (1) is laid on the surface layer in the direction which is perpendicular to the orientation. The neodymium iron boron magnet with $(TbF_3)_{46}(DyO_3)_{48}Nd_2ZnSnCu_2$ powder solidified layer solidified on the surface thereof is obtained by hot-pressing sintering under the $10^{-3}$ pa of vacuum, 40 Mpa of pressure, and 760° C. of temperature, using spark plasma sintering technology, wherein the thickness in the orientation direction is 6.5 mm.

(3) The magnet with a uniform powder solidified layer on the surface obtained in step (2) is placed in a vacuum heat treatment furnace, and maintained under the less than $10^{-3}$ pa of vacuum and 800° C. of temperature for 6 hours; and cooled with furnace to no higher than 50° C.

(4) The magnet obtained in step (3) is further subjected to tempering treatment at 510° C. for 4 hours to obtain a magnet with improved performance.

Control 9 is set when a magnet with improved performance is prepared according to the method of this example. The preparation method of control 9 is as follows: using traditional powder metallurgy technology (as for detailed preparation technology, refer to the contents in chapters 7-11 of "Sintered neodymium iron boron rare earth permanent magnet material and technology" Zhou Shouzeng, et al., 2012, Metallurgical Industry Press) to perform smelting, powdering, molding, and sintering with the same composition formulation as example 9; the properties of magnet obtained are shown in Table 1.

The coercive force of the rare earth permanent magnet material prepared and obtained in this example increases by 9100 Oe, and the residual magnetism decreases slightly by 190 Gs. The magnet performance test results of example 9 and control 9 are shown in Table 1.

TABLE 1

| The magnet performance test results of Examples 1-9 and controls 1-9 | | | | | | | |
|---|---|---|---|---|---|---|---|
| Item | Dimension ($mm^3$) | Br (kGs) | Hcj (kOe) | Item | Dimension ($mm^3$) | Br (kGs) | Hcj (kOe) |
| Example 1 | 20 * 15 * 1.96 | 12.79 | 41.33 | Control 1 | 20 * 15 * 1.96 | 13.01 | 25.07 |
| Example 2 | 25 * 15 * 3 | 13.625 | 25.53 | Control 2 | 25 * 15 * 3 | 13.81 | 17.83 |
| Example 3 | 25 * 15 * 5 | 13.13 | 27.28 | Control 3 | 25 * 15 * 5 | 13.32 | 13.28 |
| Example 4 | 25 * 15 * 3 | 13.095 | 17.68 | Control 4 | 25 * 15 * 3 | 13.31 | 13.18 |
| Example 5 | 30 * 15 * 6 | 14.012 | 32.2 | Control 5 | 30 * 15 * 6 | 14.2 | 20.2 |
| Example 6 | 25 * 15 * 3 | 11.612 | 20.5 | Control 6 | 25 * 15 * 3 | 11.83 | 15.9 |
| Example 7 | 35 * 15 * 8 | 13.505 | 27.5 | Control 7 | 35 * 15 * 8 | 13.7 | 18.5 |
| Example 8 | 35 * 15 * 6 | 13.003 | 21.15 | Control 8 | 35 * 15 * 6 | 13.2 | 13.45 |
| Example 9 | 35 * 15 * 4.5 | 13.48 | 33.9 | Control 9 | 35 * 15 * 4.5 | 13.67 | 24.8 |

Examples 10-13

Except that the thickness of the composite powder laid is different from that of example 2, other process parameters of Examples 10-13 are the same as example 2; wherein the thickness of the composite powder layer in example 10 is about 12 μm, the thickness of the composite powder layer in example 11 is about 20 μm, the thickness of the composite powder layer in example 12 is about 5 μm, and the thickness of the composite powder layer in example 13 is about 30 μm. The magnet performance test results of examples 10-13 and example 2 are shown in Table 2.

Examples 14-15

Except for the holding temperature and the temperature holding time in the vacuum heat treatment in step (3) of examples 14-15, which are different from those of example 2, other process parameters of examples 14-15 are the same as example 2; wherein the condition of vacuum heat treatment in example 14 is: the 950° C. of holding temperature for 4 h, and the condition of vacuum heat treatment in example 15 is the 700° C. of holding temperature for 30 h. The magnet performance test results of examples 14-15 and example 2 are shown in Table 2.

Examples 16-17

Except for the tempering treatment temperature and time in step (4) of examples 16-17, which are different from those of example 2, other process parameters of examples 16-17 are the same as example 2; wherein the tempering treatment condition in example 16 is: (tempering treatment at) 420° C. for 10 h, the tempering treatment condition in example 17 is: (tempering treatment) at 640° C. for 2 h. The magnet performance test results of examples 16-17 and example 2 are shown in Table 2.

TABLE 2

| The magnet performance test results of examples 10-17 and example 2 | | | |
|---|---|---|---|
| Item | Dimension ($mm^3$) | Br (kGs) | Hcj (kOe) |
| Example 2 | 25 * 15 * 3 | 13.625 | 25.53 |
| Example 10 | 25 * 15 * 3 | 13.75 | 20.55 |
| Example 11 | 25 * 15 * 3 | 13.69 | 23.05 |
| Example 12 | 25 * 15 * 3 | 13.78 | 19.24 |
| Example 13 | 25 * 15 * 3 | 13.61 | 25.65 |
| Example 14 | 25 * 15 * 3 | 13.55 | 25.02 |
| Example 15 | 25 * 15 * 3 | 13.76 | 20.73 |

TABLE 2-continued

| The magnet performance test results of examples 10-17 and example 2 | | | |
|---|---|---|---|
| Item | Dimension ($mm^3$) | Br (kGs) | Hcj (kOe) |
| Example 16 | 25 * 15 * 3 | 13.64 | 24.52 |
| Example 17 | 25 * 15 * 3 | 13.63 | 24.06 |

Examples 18-23

Except that the composition of the composite powder used in examples 18-23 is different from that of example 2, other process parameters of examples 18-23 are the same as those of example 2; the specific composition of the composite powder and the magnet performance test results of examples 18-23 and example 2 are shown in Table 3.

TABLE 3

| The magnet performance test results of examples 18-23 and example 2 | | | | |
|---|---|---|---|---|
| Item | The composition of composite powder | Dimension ($mm^3$) | Br (kGs) | Hcj (kOe) |
| Example 2 | $(DyF_3)_{95}Nd_1Al_4$ | 25*15*3 | 13.625 | 25.53 |
| Example 18 | $(DyF_3)_{50}Nd_{10}Al_{40}$ | 25*15*3 | 13.71 | 22.09 |
| Example 19 | $(DyF_3)_{55}Nd_{20}Al_{25}$ | 25*15*3 | 13.69 | 22.92 |
| Example 20 | $(DyF_3)_{85}Nd_5Al_{10}$ | 25*15*3 | 13.66 | 24.96 |
| Example 21 | $(DyF_3)_{70}Nd_{10}Al_{20}$ | 25*15*3 | 13.68 | 23.61 |
| Example 22 | $(DyF_3)_{83}Nd_{10}Al_{17}$ | 25*15*3 | 13.66 | 24.8 |
| Example 23 | $(DyF_3)_{75}Nd_{18}A_{17}$ | 25*15*3 | 13.67 | 24.32 |

Examples 24-26

The composite powder used in examples 1-3 is added directly into the sintered neodymium iron boron powder, and after mixing, SPS hot pressing is performed, followed by sintering and aging in examples 24-26. The process parameters of SPS hot pressing, sintering and aging in examples 24-26 are the same as those of the corresponding example. The test results of examples 24-26, examples 1-3, and controls 1-3 are shown in Table 4.

TABLE 4

| The magnet performance test results of examples 1-3, examples 24-26 and controls 1-3 | | | |
|---|---|---|---|
| Item | Dimension ($mm^3$) | Br (kGs) | Hcj (kOe) |
| Control 1 | 20 * 15 * 1.96 | 13.01 | 25.07 |
| Example 1 | 20 * 15 * 1.96 | 12.79 | 41.33 |
| Example 24 | 20 * 15 * 1.96 | 12.99 | 25.88 |
| Control 2 | 25 * 15 * 3 | 13.81 | 17.83 |

TABLE 4-continued

The magnet performance test results of examples 1-3, examples 24-26 and controls 1-3

| Item | Dimension ($mm^3$) | Br (kGs) | Hcj (kOe) |
|---|---|---|---|
| Example 2 | 25 * 15 * 3 | 13.625 | 25.53 |
| Example 25 | 25 * 15 * 3 | 13.8 | 18.35 |
| Control 3 | 25 * 15 * 5 | 13.32 | 13.28 |
| Example 3 | 25 * 15 * 5 | 13.13 | 27.28 |
| Example 26 | 25 * 15 * 5 | 13.3 | 14.1 |

Obviously, the above-mentioned examples are merely examples for clear description, and are not limitations on the embodiment. For those skilled in the art, other different forms of changes or modifications can be made on the basis of the above-mentioned description. There is no need and cannot be exhaustive for all embodiments. However, the obvious changes or modifications extended thereby are still within the protection scope created by the present invention.

What is claimed is:

1. A preparation method of a rare earth permanent magnet material, characterized by comprising:

a sintering treatment step performed by laying a composite powder for diffusion on the surface of a neodymium iron boron magnetic powder layer and carrying out spark plasma sintering treatment to obtain a neodymium iron boron magnet with a diffusion layer solidified on the surface thereof, wherein a compositional proportional formula of the composite powder for diffusion is $(TbF_3)_{95}Nd_2Al_3$, $(DyF_3)_{95}Nd_1Al_4$, $(DyF_3)_{85}Nd_5Al_{10}$, $(DyF_3)_{83}Nd_{10}Al_7$ or $(DyF_3)_{75}Nd_{18}Al_7$;

a diffusion heat treatment step performed by carrying out a diffusion heat treatment on the neodymium iron boron magnet with the diffusion layer solidified on the surface thereof and performing a cooling to obtain a diffused neodymium iron boron magnet; and a tempering treatment step performed by carrying out a tempering treatment on the diffused neodymium iron boron magnet to obtain the rare earth permanent magnet material.

2. The preparation method of a rare earth permanent magnet material according to claim 1, characterized in that a thickness of the neodymium iron boron magnetic powder layer is controlled to 1-12 mm in an orientation direction.

3. The preparation method of a rare earth permanent magnet material according to claim 1, characterized in that conditions of the diffusion heat treatment are that a vacuum degree is not lower than $10^{-3}$ Pa, a temperature is 700-950° C., a temperature holding time is 2~30 hours.

4. The preparation method of a rare earth permanent magnet material according to claim 1, characterized in that the cooling means furnace cooling to not higher than 50° C.

5. The preparation method of a rare earth permanent magnet material according to claim 1 characterized in that a temperature of the tempering treatment is 420-640° C., and a temperature holding time of the tempering treatment is 2-10 hours.

6. The preparation method of a rare earth permanent magnet material according to claim 1, characterized in that conditions of the spark plasma sintering treatment are that a vacuum degree is not lower than $10^{-3}$ Pa, a pressure is 20-60 MPa, and a temperature is 700-900° C.

7. The preparation method of a rare earth permanent magnet material according to claim 1, characterized in that a particle size of the composite powder for diffusion is smaller than 150 mesh.

8. The preparation method of a rare earth permanent magnet material according to claim 7, characterized in that conditions of the spark plasma sintering treatment are that a vacuum degree is not lower than $10^{-3}$ Pa, a pressure is 20-60 MPa, and a temperature is 700-900° C.

9. The preparation method of a rare earth permanent magnet material according to claim 1, characterized in that a thickness of the composite powder for diffusion laid on the surface of the neodymium iron boron magnetic powder layer is 5-30 μm.

10. The preparation method of a rare earth permanent magnet material according to claim 9, characterized in that the surface on which the composite powder for diffusion is laid is perpendicular to an orientation of the neodymium iron boron magnetic powder.

11. The preparation method of a rare earth permanent magnet material according to claim 9, characterized in that conditions of the spark plasma sintering treatment are that a vacuum degree is not lower than $10^{-3}$ Pa, a pressure is 20-60 MPa, and a temperature is 700-900° C.

* * * * *